(12) United States Patent
Brun

(10) Patent No.: US 7,921,744 B2
(45) Date of Patent: Apr. 12, 2011

(54) ROLLING SCREW

(75) Inventor: Giancarlo Brun, Thiene (IT)

(73) Assignee: ARES Engineering S.R.L., Carre (VI) (IT)

( * ) Notice: Subject to any disclaimer, the term of this patent is extended or adjusted under 35 U.S.C. 154(b) by 729 days.

(21) Appl. No.: 11/886,010

(22) PCT Filed: Jul. 30, 2005

(86) PCT No.: PCT/EP2005/008287
§ 371 (c)(1),
(2), (4) Date: Sep. 10, 2007

(87) PCT Pub. No.: WO2006/094535
PCT Pub. Date: Sep. 14, 2006

(65) Prior Publication Data
US 2008/0210039 A1    Sep. 4, 2008

(30) Foreign Application Priority Data
Mar. 9, 2005   (IT) .............................. VI2005A0065

(51) Int. Cl.
*F16H 1/24*    (2006.01)
*F16H 55/02*   (2006.01)
(52) U.S. Cl. ................. 74/424.94; 74/424.95
(58) Field of Classification Search ............... 74/424.71, 74/424.94, 424.95
See application file for complete search history.

(56) References Cited

U.S. PATENT DOCUMENTS

| | | | | |
|---|---|---|---|---|
| 2,482,082 A | * | 9/1949 | Wahlberg | 74/424.94 |
| 2,616,302 A | * | 11/1952 | Wahlmark | 74/424.94 |
| 3,614,900 A | * | 10/1971 | Wahlmark | 74/424.94 |
| 3,730,016 A | * | 5/1973 | Miller | 74/424.94 |
| 3,733,914 A | * | 5/1973 | Sheesley | 74/424.94 |
| 4,648,285 A | | 3/1987 | Carson | |
| 5,956,997 A | * | 9/1999 | Oetjen et al. | 74/424.94 |

FOREIGN PATENT DOCUMENTS

| | | |
|---|---|---|
| EP | 1 452 762 A2 | 9/2004 |
| EP | 1 617 103 A1 | 1/2006 |
| GB | 2 111 635 A | 7/1983 |
| WO | WO-2004/094870 A1 | 11/2004 |
| WO | WO-2004/113762 A2 | 12/2004 |

* cited by examiner

*Primary Examiner* — Justin Krause
(74) *Attorney, Agent, or Firm* — Birch, Stewart, Kolasch & Birch, LLP

(57) ABSTRACT

Rolling screw (1) comprising a first threaded male member (6), a second threaded member (3), means (5) that permit said second threaded member (3) to rotate freely in relation to the housing (2), as well as means (7) that permit to maintain fixed and constant the position of the axis of said first threaded member (6) in relation to the housing (2). Means of synchronization are also foreseen for the relative rotation between said first member (6) and said second member (3). Said screw is characterized in that at least one of the two threaded members presents a threading conformation such to permit the transmission of the rotation motion to another element without relative tangential sliding action.

15 Claims, 11 Drawing Sheets

Sec. II-II

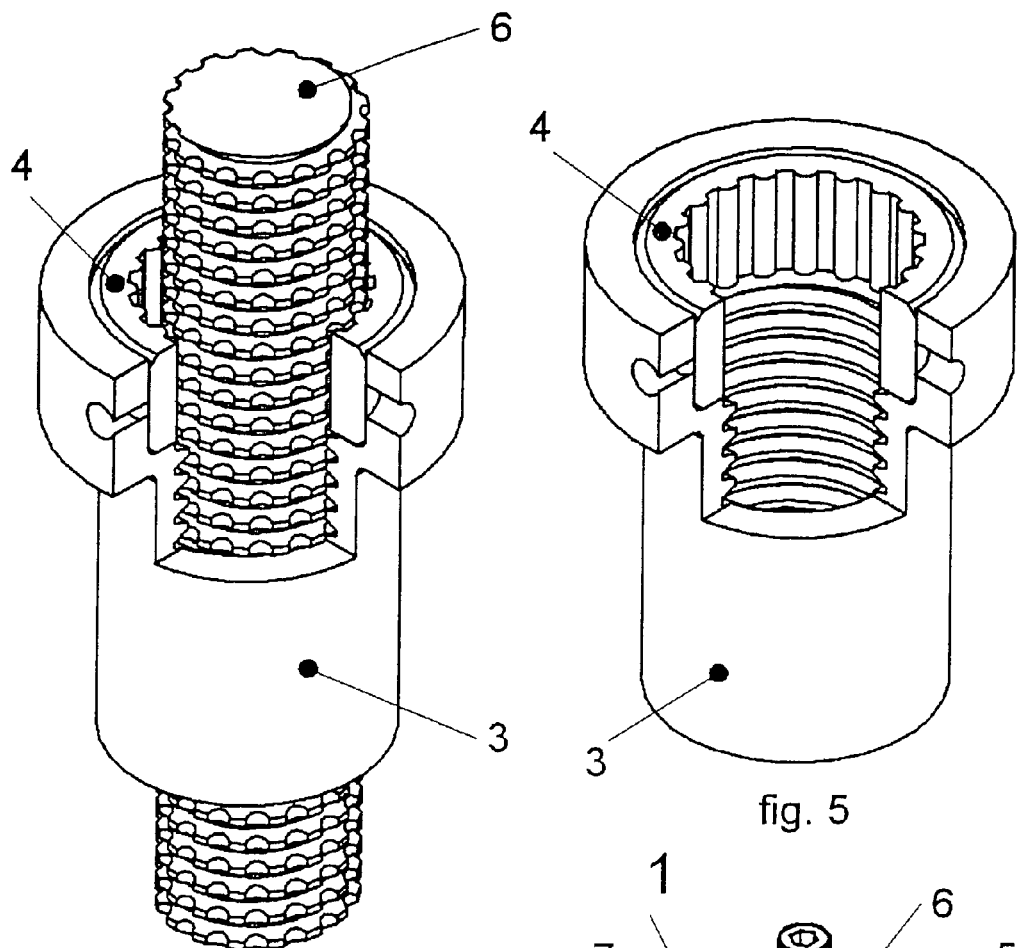
fig. 4
fig. 5
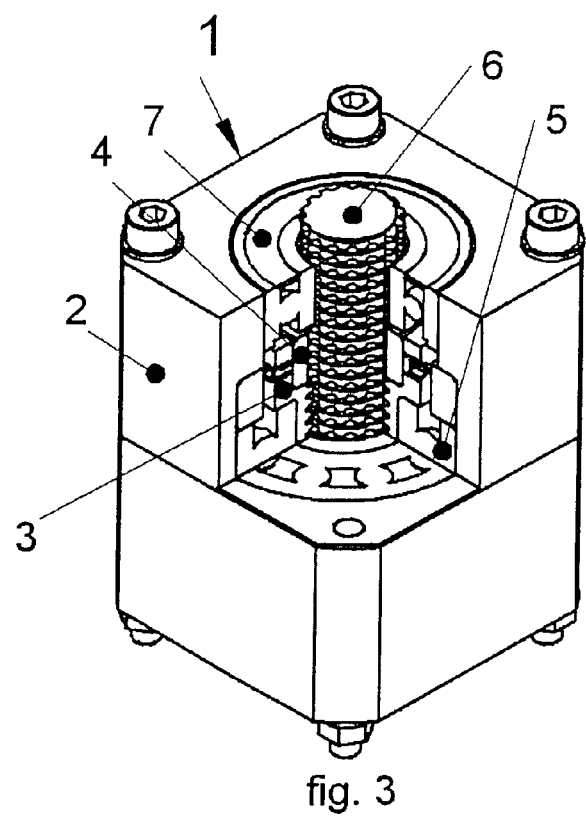
fig. 3

Sec. III-III

Sec. IV-IV

Sec. V-V

Sec. VI-VI

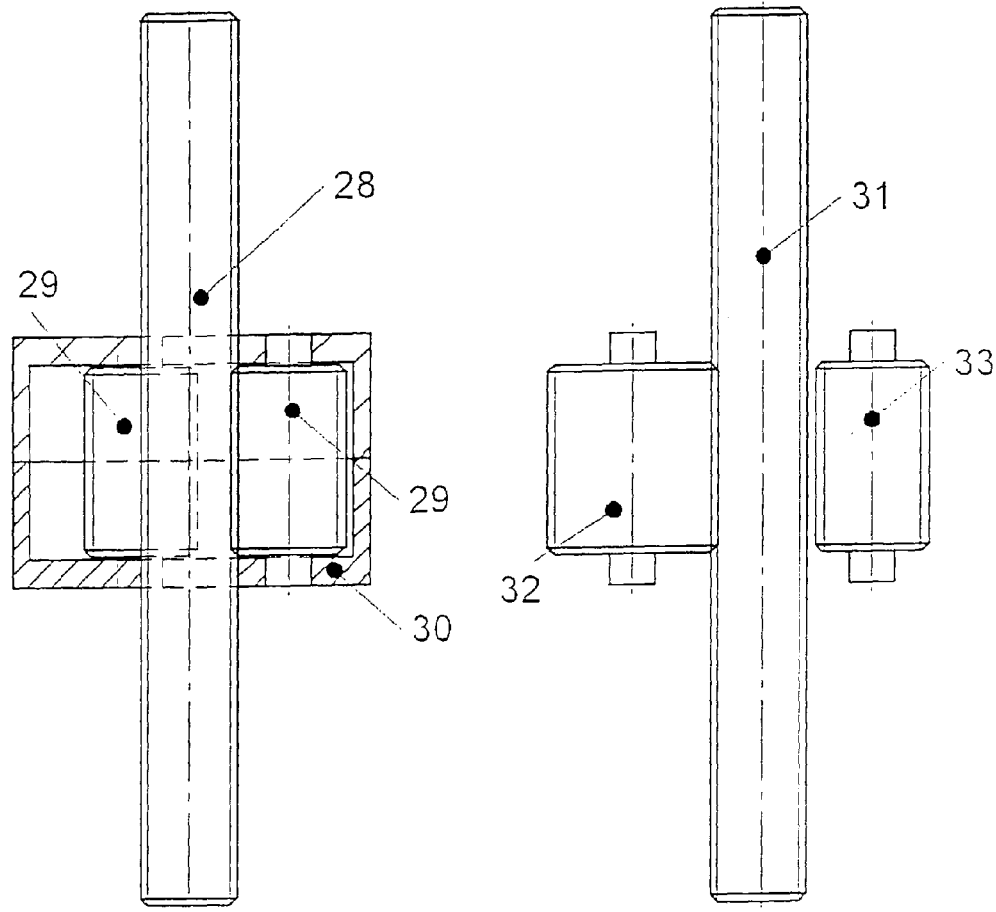
Sec. VII-VII
fig. 29
fig. 31
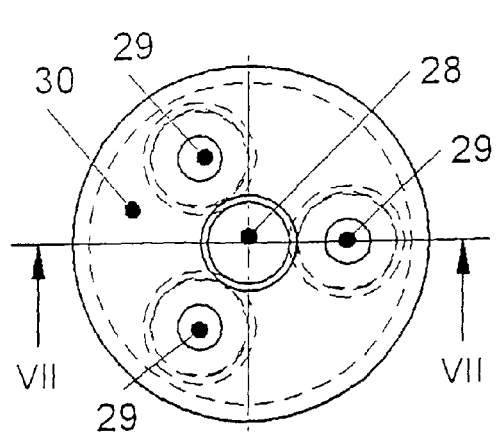
fig. 28
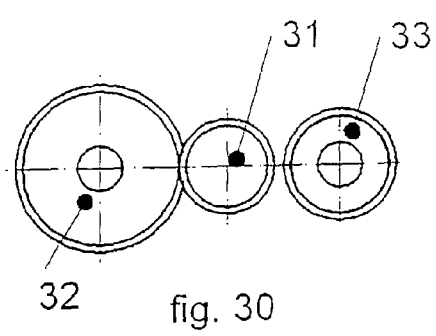
fig. 30

Sec. VIII-VIII

Sec. IX-IX

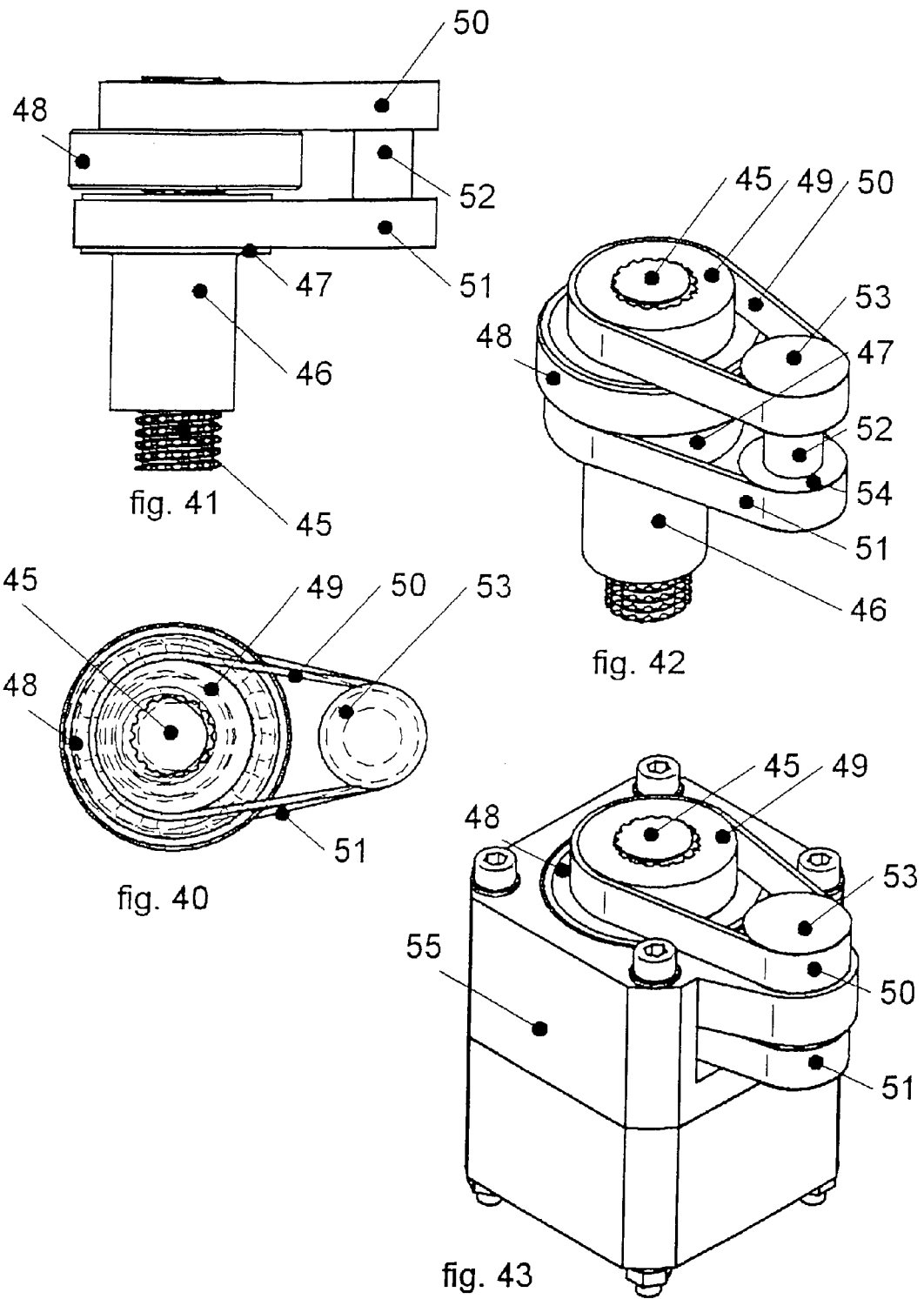

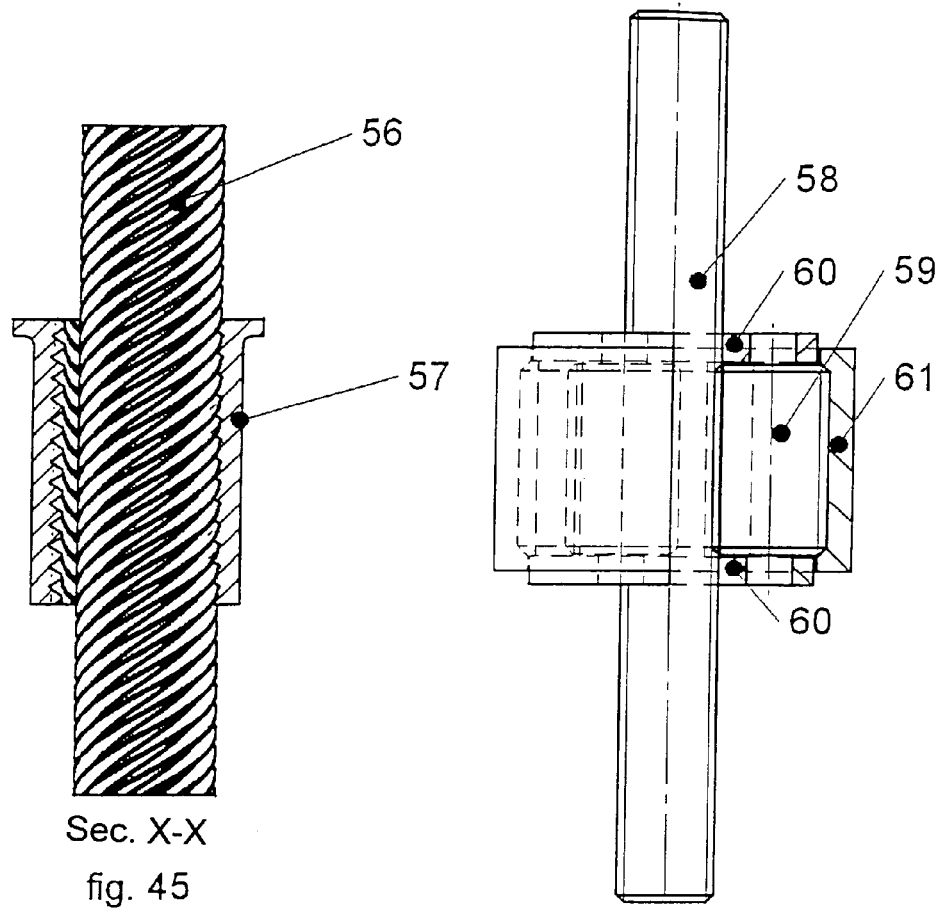
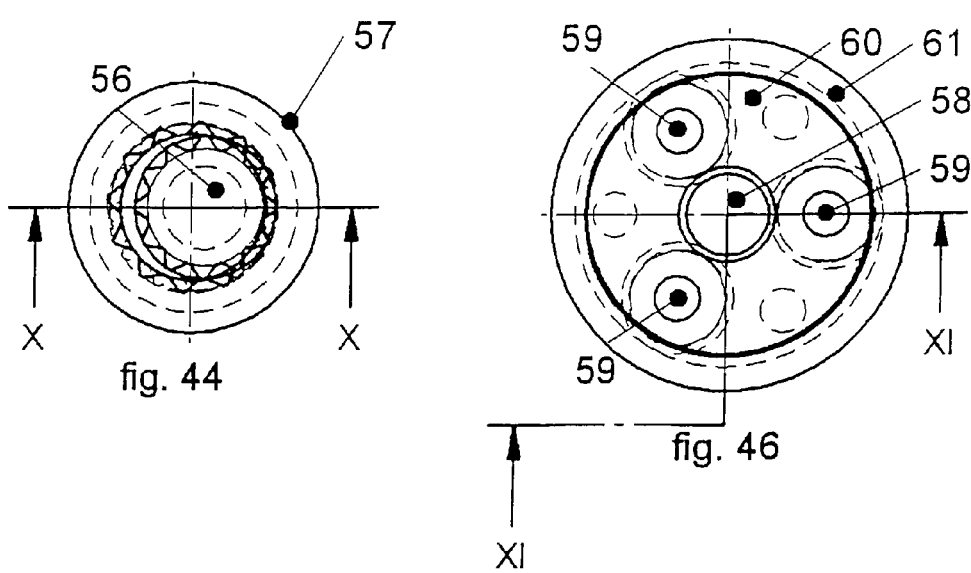
Sec. X-X
fig. 45
Sec. XI-XI
fig. 47
fig. 44
fig. 46

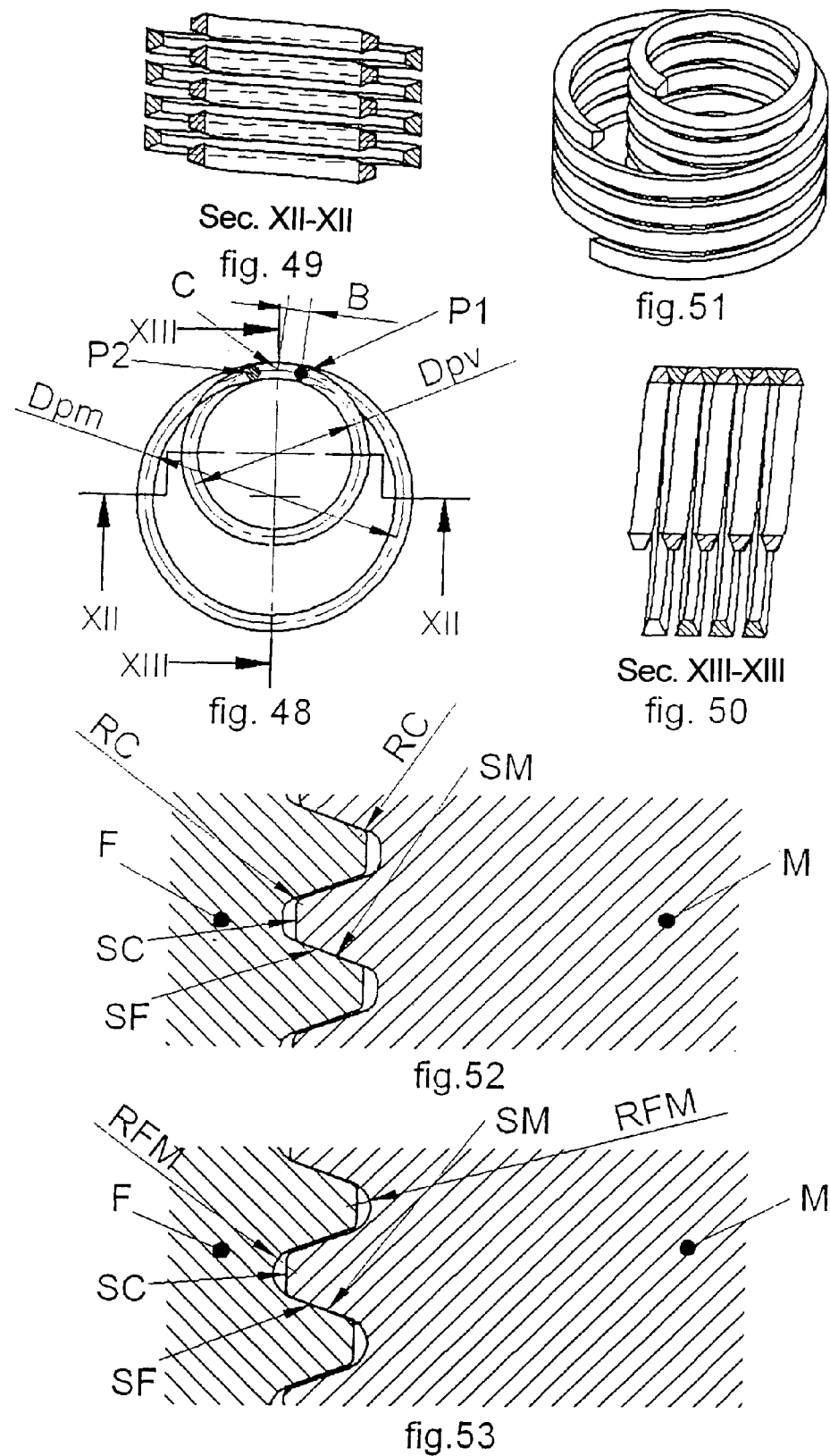

ROLLING SCREW

The present finding relates to a roller screw, according to the general part of claim 1.

BACKGROUND ART

On the linear actuators composed of one or more threaded nut screws or threaded male rollers, against whose thread a screw is turned having the same thread step (or a step equal to a complete multiple or fraction, whose inverse is an integer) already described in other documents (U.S. Pat. No. 3,395, 385, U.S. Pat. No. 3,730,016, U.S. Pat. No. 3,756,092), the following problems have been detected:

Impossibility of guaranteeing a linear movement proportional to the number of screw revolutions;

irregular travel velocity when the axial load of the screw drops to minimum values, due to the blocking of the nut screw bearings which are not sufficiently loaded, and to the sliding of the screw on the blocked nut screw: this provokes a travel with an irregular step and at most, equal to the threading step;

low efficiency, due to the use of inadequate thread profiles;

presence of pre-loads which, inserted for the purpose of avoiding the accidental blocking of the nut screw or the roller (or the screw) because of an excessively reduced load, drastically reduce the mechanism efficiency;

hardening or blocking in the case of a screw coupled simultaneously with more than one nut screw or roller.

In reality, the findings described in such existing documents particularly attempt to:

use the preload to resolve the problem of travel irregularity;

block the nut screw (or the screws) to obtain a dual travel velocity equal to the screw rotation velocity;

vary the travel by revolutions of the screw, in either manual or automatic mode, in step or continuous mode, in order to adapt the velocity to the load equal to the rpm of the system drive motor.

In particular, in the document U.S. Pat. No. 3,730,016, there is a variation device for linear travel by screw revolution according to load: however this does not possess function precision, is not efficient and the under maximum loads the threading is subjected to stress in proximity to the crest, which represents the weakest zone.

Only one document WO2004/113762 A2, whose inventor is the same as the inventor of the present invention, mentions the presence of synchronisation, however, without mentioning the device that actuates the above synchronisation.

None of the known systems, lacking synchronisation, guarantee constant and accurate travel for each revolution of the control shaft, regardless of the external load and the construction and assembly tolerances of the device. None of the cited documents performs a precise analysis of the screw/nut screw coupling, the contact points, and the causes of the poor efficiency caused by the threading profile.

None of these documents mentions the effects of the pre-load compression between screw and nut screw.

None of the documents mentions the effect of a very slight clearance between coupled threads in order to increase efficiency.

There is no reference to any surface hardening treatment to be carried out in order to prevent anticipated contact point wear between screw and nut screw.

Presentation of the Finding.

The primary object of the present finding is to realise a device which guarantees screw travel precision, regardless of the acting load.

Another object is to realise a device which is intrinsically reliable, safe and long-lasting in time.

A further object is to realise a device that is efficient.

Such objects are achieved according to the claims, and in particular according to the characterising part of claim 1:

by means of the synchronisation of the rotation of the elements coupled on the thread, obtained in a simple, economical and reliable manner, which can be realised by means of common machine tools and known processing techniques, through a particular conformation of the thread of at least one of the two elements coupled on the thread; in fact any synchronisation system that imposes a fixed and constant ratio between the number of screw revolutions and that of the nut screw or the roller, prevents travel irregularity and fixes the travel per revolution at a known value, regardless of the loads and frictions present;

by means of a coupling system between the threads that minimise losses due to friction;

by means of a threading profile that minimises losses due friction and improves thread resistance;

by means of a surface hardening treatment that reduces losses due to friction, and wear on the coupled threads.

BRIEF DESCRIPTION OF THE DRAWINGS

Further characteristics and advantages of the invention will be made more clear through the detailed description of some preferred, but by no means exclusive, embodiments of a device according to the finding, illustrated as a non-limiting example, with the help of the appended drawing tables wherein:

FIG. 3 (TABLE II) represents a perspective view of the cutaway of the device of FIGS. 1 and 2;

FIG. 4 (TABLE II) represents a perspective view of the screw of the device of FIGS. 1, 2, and 3, with the toothed crest of the thread inserted in the nut screw;

FIG. 5 (TABLE II) represents a perspective view of the cutaway of the only nut screw of the device of FIGS. 1, 2, 3, having a keyed gear;

FIGS. 28 and 29 (TABLE VII) represent respectively a plan view and a sectioned front elevation view of a screw coupled with three identical rollers;

FIGS. 30 and 31 (TABLE VII) represent respectively a plan view and a sectioned front elevation view of a screw coupled with two different rollers;

FIGS. 40, 41, and 42 (TABLE IX) represent respectively a plan view, a front elevation view and a perspective view of screw and nut screw synchronised by means of belts and pulleys;

FIG. 43, (TABLE IX) represents a perspective view of the device complete with synchronisation according to FIGS. 40, 41, 42;

FIGS. 44 e 45 (TABLE IX) represent respectively a plan view and a sectioned front elevation view of a screw inserted in a nut screw, synchronised by means of sloped threading;

FIGS. 46 and 47 (TABLE X) represent respectively a plan view and a sectioned front elevation view of a screw with satellite rollers equipped with synchronisation on the thread and smooth walls of the housing;

FIGS. 48, 49, 50, 51 (TABLE XI) represent respectively a plan view, a sectioned front elevation view, a sectioned side view, and a perspective view of a male thread set in a female thread having a greater nominal diameter;

FIG. 52 (TABLE XI) represents a section of an ideal thread according to the finding;

FIG. 53 (TABLE XI) represents a further example of a ideal thread according to the finding.

DESCRIPTION OF SOME EMBODIMENTS OF THE FINDING

Figure 2:
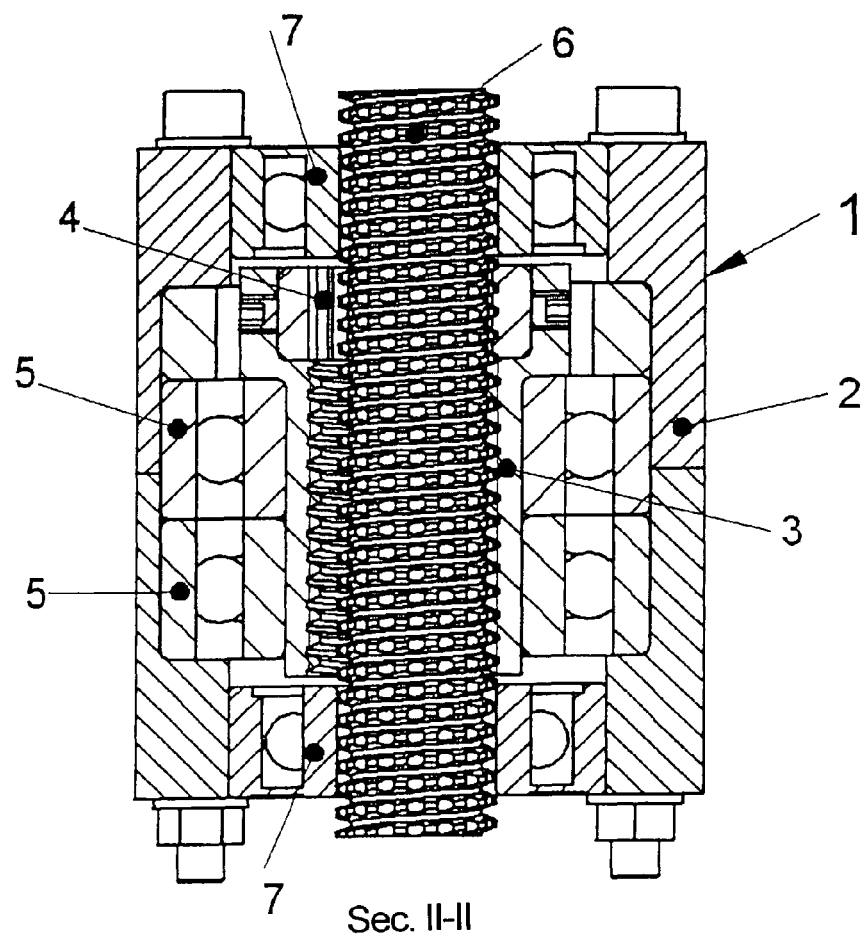
FIGS. 1 and 2 (TABLE I) represent respectively a plan view and a front elevation view, sectioned according to line II-II, of a synchronised device according to the finding.
Figure 1:
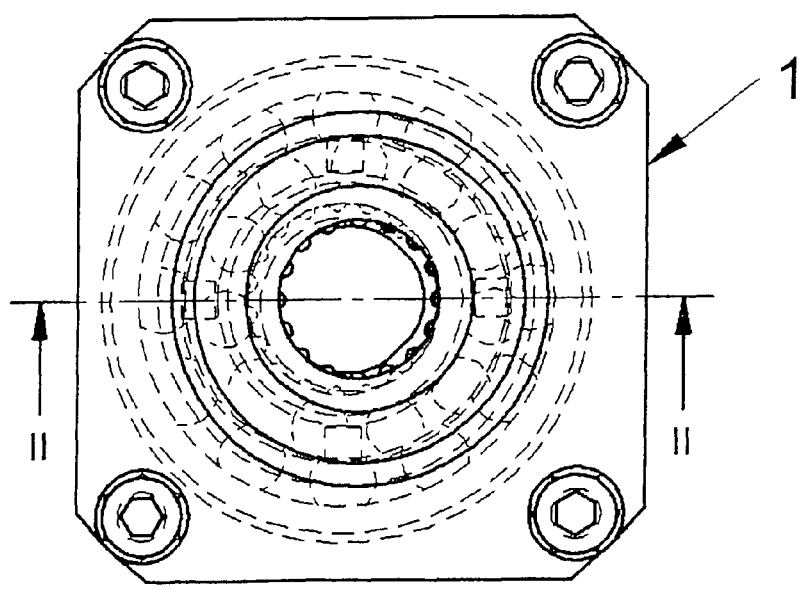

With particular reference to the mentioned figures, a first, preferred, but not exclusive embodiment of the device according to the finding, identified throughout by the numeral 1 (FIGS. 1, 2, 3) is described. The device results as being particularly advantageous for the conversion of the rotary motion in linear motion with regular movement, accurate positioning, high efficiency levels, low torque, required for the command.

Device 1 comprises a body or housing 2 of the various members, composed of two parts united by screws, a nut screw 3 equipped with a ring gear 4, two nut screw support bearings 5, a screw 6 with a toothed thread crest, guided in the axial run by two guide bearings 7. The guide bearings 7 present a hole with the same nominal diameter as screw 6; screw 6 is inserted in the hole with a very slight clearance, in order to permit axial sliding. Screw 6 has a threading with a nominal diameter lower than that of the nut screw 3. The nut screw 3 is mounted eccentrically within the body 2, so that the threads of screw 6 and nut screw 3 make contact with each other, although a very slight clearance remains between them (indicatively between 0.001 and 0.1 mm). At the same time, the toothing on the thread crest of screw 6 meshes with the toothing of the gear 4 fixed to nut screw 3, limiting the ratio between the number of revolutions of the screw 6, and that of the nut screw 3. The gear 4 is, in fact, fixed rigidly to the nut screw 3. Moreover, the gear ratio is equal to the ratio that would exist, even without toothing, between the rolling pitch diameter of the screw and nut screw. In this manner, without affecting the efficiency of the mechanism, an extremely precise travel step is guaranteed, without irregularities, and whiplash action, regardless of the external load. The particular thread conformation, with cylindrical surface of the crest of the screw thread (except at the toothing slots) the convex flank surfaces of the screw thread, the concave flank surfaces of the nut screw thread, and the surface hardening treatment of the parts in relative motion in contact with each other (threadings, toothings and guides) guarantee high efficiency and wear resistance.

More in general, a synchroniser, in a preferred but not exclusive embodiment, is composed of one or more screws (6, 23, 25, 28, 31, 34, 36, 37, 39, 40, 42, 58) having threading equipped with toothing on the crest, also composed of one or more nut screws (3, 24, 26, 27, 35, 38, 43), or of one or more male threaded rollers (29, 32, 33, 41, 59), whereon each is secured at least one toothed gear 4 able to couple with the toothing of the crest of the threads of the screw.

In another preferred but not exclusive embodiment, the synchroniser can also be composed of a screw (16, 17, 18, 19, 20, 21, 22, 23, 25, 28, 31, 34, 36, 37, 39, 40, 42, 58) with thread equipped with toothing, also composed of one or more nut screws (8, 9, 10, 11, 12, 13, 14, 24, 26, 27, 35, 38, 43) or of one or more rollers (15, 29, 32, 33, 41, 59) whose thread is toothed in a manner so that it is able to couple with the thread toothing of the screw. In this case, fixed ring gears are not necessary on the nut screws or the rollers.

Figure 6:
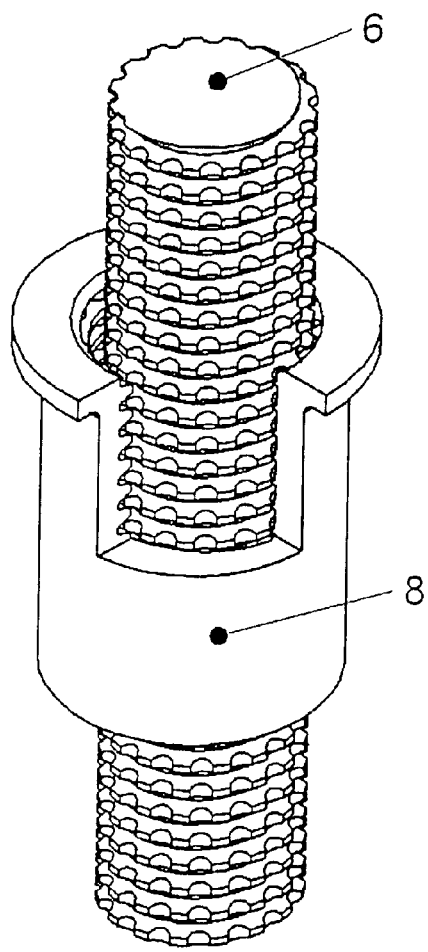
FIGS. 6 and 7 (TABLE III) represent perspective views of the cutaway of the nut screw and screw in another embodiment of the device according to the finding, with the nut screw having a toothing in the groove of the thread.
Figure 8:
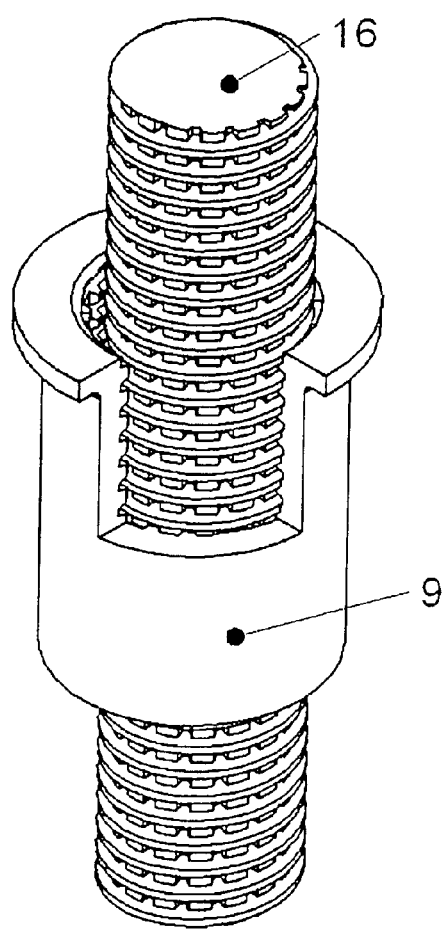
FIGS. 8 and 9 (TABLE III) represent perspective views of the cutaway of the nut screw and screw in another embodiment of the device according to the finding, with the nut screw having a toothing in the crest of the thread.
Figure 7:
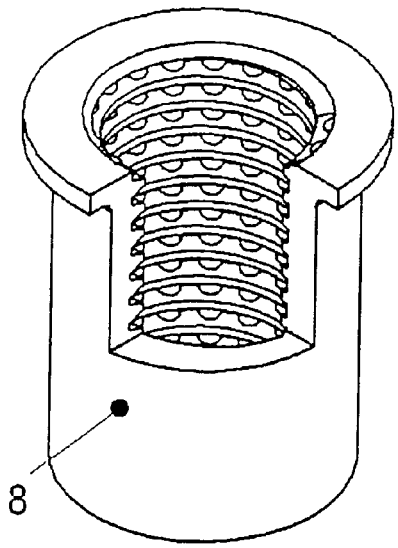
Figure 9:
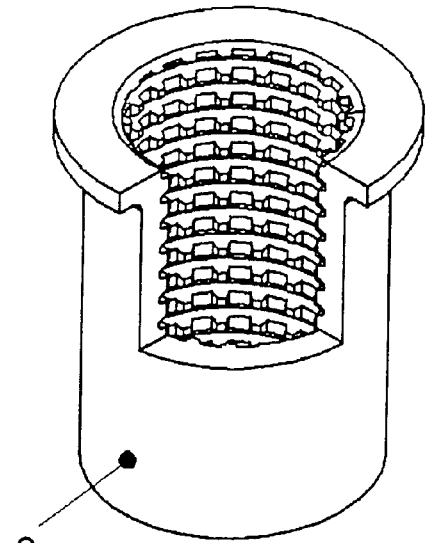
Figure 10:
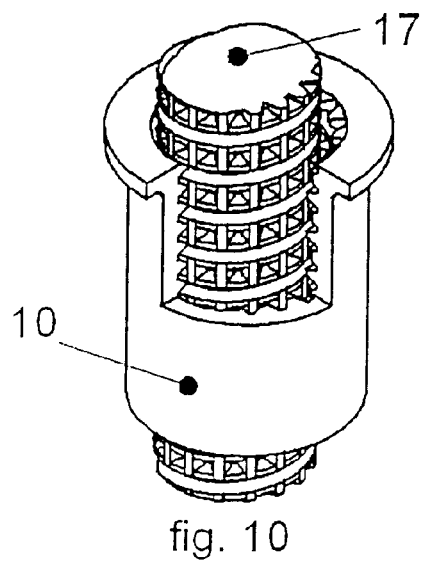
FIGS. 10 and 11 (TABLE IV) represent perspective views of the cutaway of the nut screw and screw in another embodiment of the device according to the finding, with the nut screw having a toothing in the groove of the thread.
Figure 11:
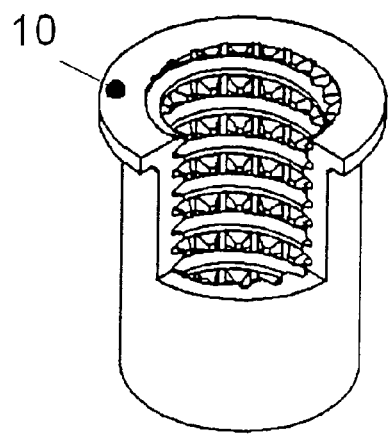
Figure 12:
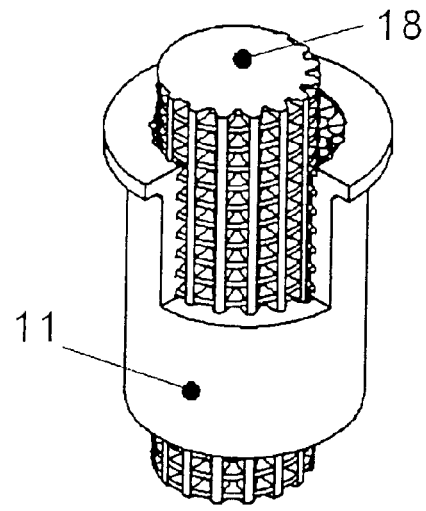
FIGS. 12 and 13 (TABLE IV) represent perspective views of the cutaway of the nut screw and screw in another embodiment of the device according to the finding, with the nut screw being equipped with protruding pegs.
Figure 13:
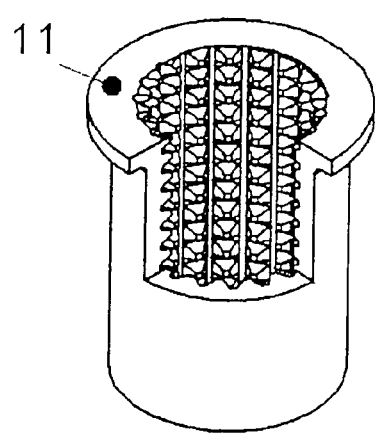
Figure 14:
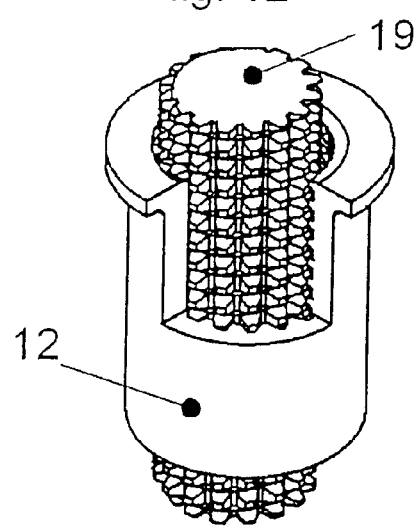
FIGS. 14 and 15 (TABLE IV) represent perspective views of the cutaway of the nut screw and screw in another embodiment of the device according to the finding, with the nut screw being equipped with slots.
Figure 15:
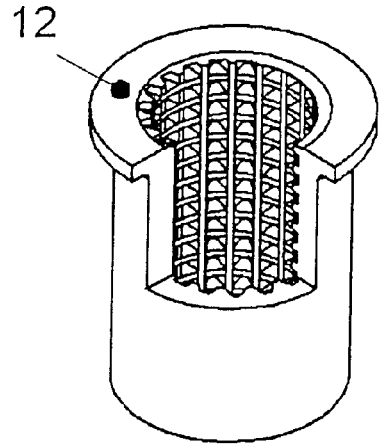
Figure 17:
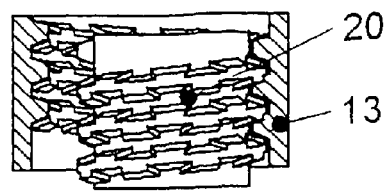
FIGS. 16, 17, 18 (TABLE V) respectively represent a plan view, a sectioned view and a perspective view of an embodiment of the synchronisation according to the finding equipped with nut screw and screw with both flanks of the thread being toothed.
Figure 20:
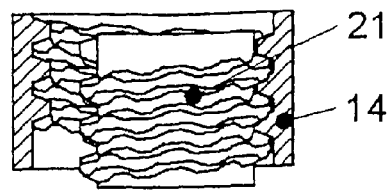
FIGS. 19, 20, 21 (TABLE V) respectively represent a plan view, a sectioned view and a perspective view of an embodiment of the synchronisation according to the finding equipped with nut screw and screw with both flanks of the thread being toothed and having round edges.
Figure 16:
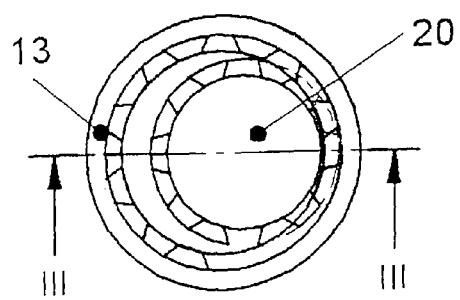
Figure 19:
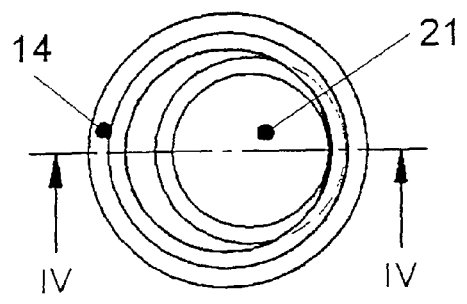
Figure 18:
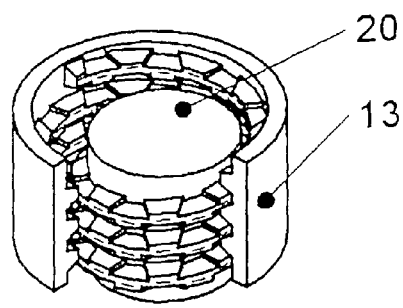
Figure 21:
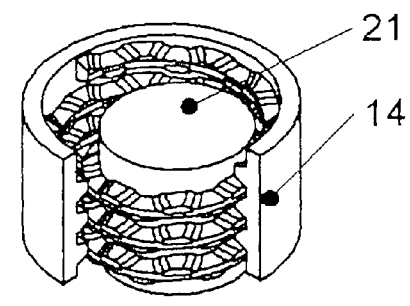
Figure 22:
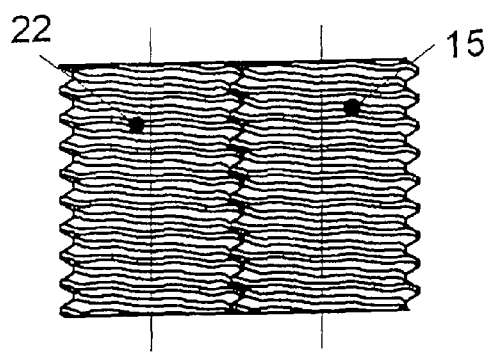
FIGS. 22 and 23 (TABLE V) respectively represent a front view and a perspective view of another embodiment of the synchronisation according to the finding equipped with a roller coupled with a screw having an undulated thread.
Figure 23:
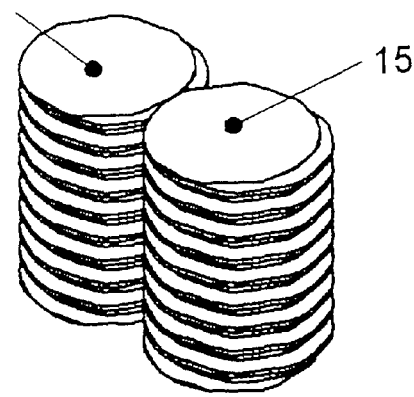

The following non-exclusive embodiments are mentioned as an example of coupling between screw and nut screw (or roller) both equipped with thread toothing:

screw having the thread equipped with toothing on the crest (6 in FIG. 6, and 17 in FIG. 10) coupled with the nut screw (8 in FIGS. 6 and 7, and 10 in FIGS. 10 and 11) having the thread equipped with groove toothing;

screw having the thread equipped with groove toothing (16 in FIG. 8) coupled with the nut screw (9 in FIGS. 8 and 9) having the thread equipped with toothing in the crest;

screw having the toothed thread reduced to a range of slots (18 in FIG. 12) arranged radially along an ideal spiral on the external surface; the step of the spiral is equal to the theoretical step of the threading; the slots can be aligned in the direction of the screw rotation axis, or they can be staggered; said screw is coupled with the nut screw (11 in FIGS. 12 and 13) having the toothed thread reduced to a range of pegs, axially aligned or staggered, arranged radially along an ideal spiral on the surface of the hole; the spiral step is equal to the theoretical step of the threading;

screw having the toothed thread reduced to a range of pegs, (19 in FIG. 14) arranged radially along an ideal spiral on the external surface; the spiral step is equal to the theoretical step of threading; the pegs can be aligned in the direction of the screw rotation axis, or they can be staggered; such screw is coupled with the nut screw (12 in FIGS. 14 and 15) having the toothed thread reduced to a range of slots, axially aligned and staggered, arranged radially along an ideal spiral on the surface of the hole; the spiral step is equal to the theoretical step of the threading;

screw having the thread equipped with toothing on both flanks (20 in FIGS. 16, 17, and 18) or on only one flank, coupled with the nut screw, having the thread also equipped with toothing on both flanks (13 in FIGS. 16, 17, and 18), or on only one flank; the teeth can be axially aligned or staggered;

screw having the thread equipped with toothing with round edges on both flanks (21 in FIGS. 19, 20, 21) coupled with the nut screw, having the thread also equipped with toothing with round edges on both flanks (14 in FIGS. 19, 20, and 21): if the teeth are staggered, the toothing edges can be round to the point that toothing itself assumes the form of an undulation of the thread, whereas, if the teeth are aligned, the toothing appears as an undulation of the thickness of the thread;

screw having the thread equipped with toothing with round edges on both flanks (22 in FIGS. 22 and 23), coupled with the roller having the thread also equipped with toothing with round edges on both flanks (15 in FIGS. 22 and 23): if the teeth are staggered, the toothing edges can be round to the point that toothing itself assumes an undulation of the thread (FIGS. 22 and 23) whereas, if the teeth are aligned, the toothing appears as an undulation of the thickness of the thread.

In each coupling between threads, the ratio of the number of teeth of the screw thread, and the number of the teeth of the ring gear or of the nut screw thread or the roller is equal to the ratio between the rolling pitch diameters respectively of the screw (Dpv [pitch diameter of the screw] in FIG. 48) and of the nut screw (Dpm [pitch diameter of the nut screw] in FIG. 48) (or of the roller). The toothing profile, whether of the screw, or of the nut screw (or roller) can be of any type (for example epicycloid, hypocycloid, involute etc). The profile of the thread can also be of any type, except for the presence of toothing.

The coupled elements have the same threading step, or different steps, but must be limited as follows: the ratio between the greater threading step and the lesser step, between coupled members must be an integer. Threadings can be multi-start. Threadings with a different number of starts, on condition that the ratio imposed above between threading steps is maintained. The threading direction of coupled elements can be the same or different according to the travel step required.

The screw can be replaced by a groove shaft. In the same way, the nut screw can be replaced by a bush with a groove hole surface, with groove step and profile so as to couple with the screw thread. Similarly, the roller can be grooved instead of threaded.

Figure 25:
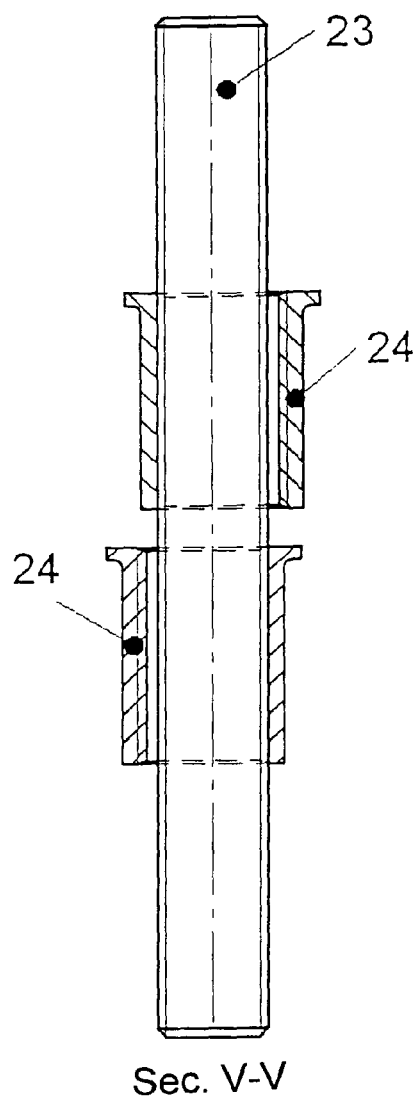
FIGS. 24 and 25 (TABLE VI) respectively represent a plan view and a sectioned front elevation view of a screw inserted into two identical nut screws.
Figure 24:
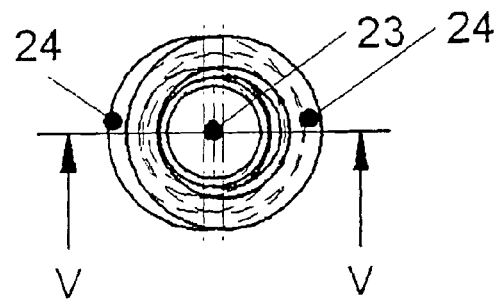

The nut screws (24 in FIGS. 24 and 25) or the male threaded rollers (29 and 59 in FIGS. 28, 29, 46, 47), when they are perfectly equal with each other both in diameter, and in the characteristics of the threading, and only under synchronisation conditions, can more than one be coupled with the screw (23, 28, 58) simultaneously, without creating problems for the system.

In this manner, the load can be divided among more nuts screws (24) or among more rollers (29, 59), and by means of particular relative positioning among the parts, the load on the screw guide bearings can be reduced or eliminated.

Two or more nut screws or two or more rollers can be also employed in order to preload the screw, eliminating the clearances, thus obtaining an extremely precise positioning to the detriment of efficiency.

Figure 27:
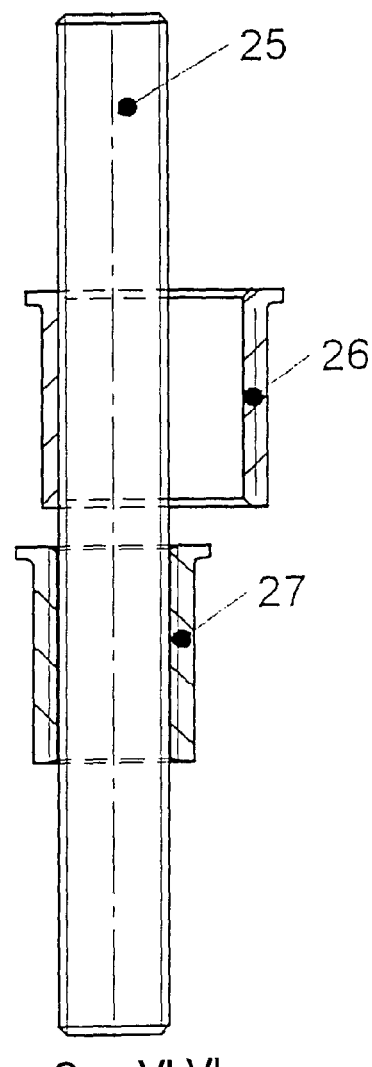
FIGS. 26 and 27 (TABLE VI) represent respectively a plan view and a sectioned front elevation view of a screw inserted into two different nut screws.
Figure 26:
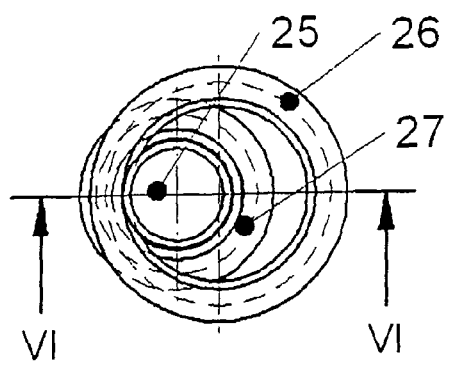

More nut screws (26 and 27, in FIGS. 26 and 27) or rollers (32 and 33 in FIGS. 30 and 31) in the same body, while having different diameters from each other, but synchronised and equipped with engagement/disengagement mechanism with the screw thread (25, 31), placed in contact with the screw one at a time, generate different travel screw steps in relation to the body.

In each of the cases the rotation command can be transmitted alternatively:
  to the screw with the nut screw (or roller) driven by the toothed thread and with blocked rotation of the body;
  to the nut screw (or roller) with the screw driven by the toothed thread and with blocked rotation of the body,
  to the body, with the nut screw (or roller) driven by the body in an eccentric rotation around the screw and with blocked rotation of the screw.

Furthermore, the axial movement can be performed by the screw (with the body fixed axially) or by the body (with the screw fixed axially).

Figure 33:
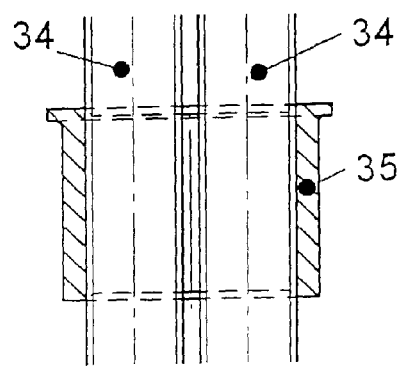
FIGS. 32 and 33 (TABLE VIII) represent respectively a plan view and a sectioned front elevation view of two identical screws inserted in the same nut screw.
Figure 35:
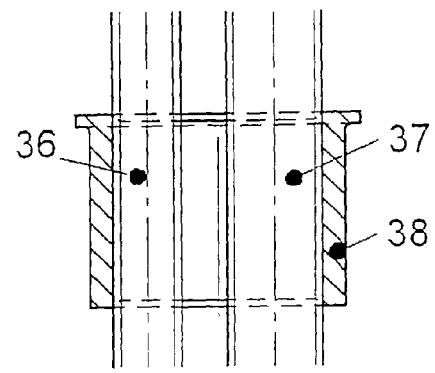
FIGS. 34 and 35 (TABLE VIII) represent respectively a plan view and a sectioned front elevation view of two different screws inserted in the same nut screw.
Figure 32:
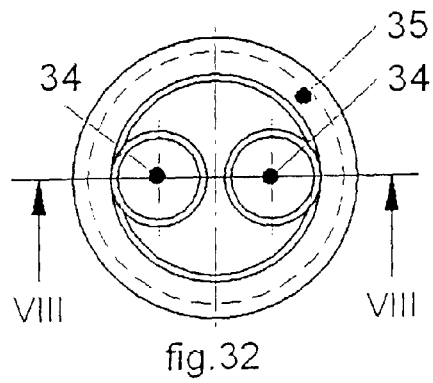
Figure 34:
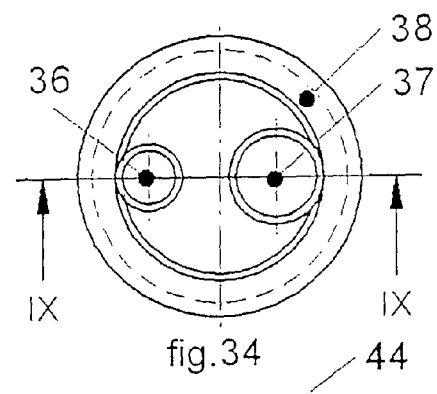

In the case where the nominal diameter of the nut screw (35, 38 in FIGS. 32, 33, 34, 35) is sufficiently greater than that of the screw, more screws can be inserted (34, 36, 37) each one with its guide bearings, into the nut screw itself (35, 38) in order to obtain:
  the same travel of the screws per nut screw revolution, in the case of identical screws, simultaneously coupled with the same nut screw (FIGS. 32 and 33);
  different travel for each screw (even in the opposite direction) per nut screw revolution, in the case of different screws (for diameter and/or threading direction and/or step, and/or number of starts) simultaneously coupled with the same nut screw (FIGS. 34 and 35);
  separate engagement/disengagement of each screw from the nut screw;
  the use of more nut screws (engaged simultaneously or separately according to the case in hand) with more screws inserted therein.

Figure 37:
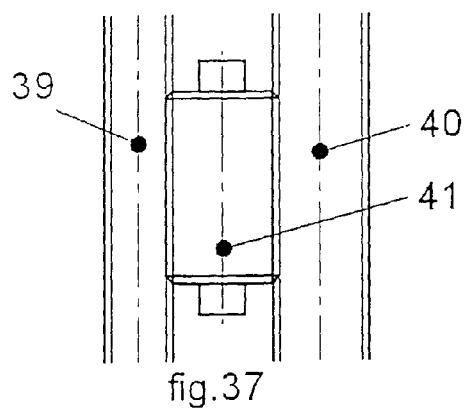
FIGS. 36 and 37 (TABLE VIII) represent respectively a plan view and a front elevation view of two different screws coupled with the same roller.
Figure 36:
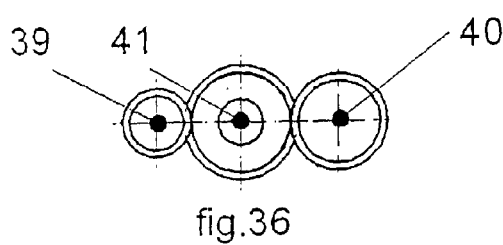

In a similar manner, a single roller (41 in FIGS. 36 and 37) regardless of its diameter, can be coupled with more screws (39, 40) each one with its guide bearings, in order to obtain:
  the same travel of the screws per roller revolution, in the case of identical screws, simultaneously coupled with the same roller;
  different travel for each screw (even in the opposite direction) per roller revolution, in the case of different screws (for diameter and/or threading direction and/or step, and/or number of starts) simultaneously coupled with the same roller;
  separate engagement/disengagement of each screw from the roller;
  the use of more rollers (engaged simultaneously or separately according to the case in hand) with more screws.

Figure 39:
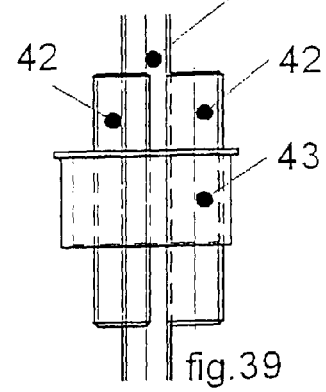
FIGS. 38 and 39 (TABLE VIII) represent respectively a plan view and a front elevation view of three different screws inserted in the same nut screw, with a fourth central screw.
Figure 38:
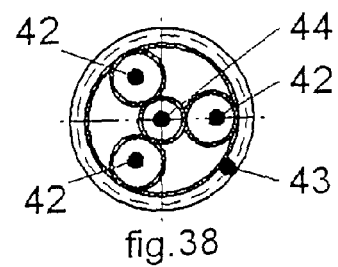

A particular combined embodiment (FIGS. 38 and 39) is composed of a nut screw (43) with more identical screws (42) inserted therein and with threading coupled therewith, in the centre a further screw (or roller) (44) is in contact with the threads of all the screws coupled with the nut screw, and it is equipped with threading of a type which makes it able to move either in the same travel direction as the screws in contact with the nut screw, or in the opposite direction.

In another embodiment, the synchronisation connection between the toothing on the thread of the screw and nut screw or roller, can also be performed by other interposed means, such as toothed gears, pulleys, belts, chains, cables, etc. as well as transmission shafts and gears, grooved profiles, etc.

As a non-exclusive example, in one of the guide bearings (48 in FIGS. 40, 41, 42, 43) of the screw (45) a bush (49) can be inserted having a hole with grooved profiles, able to mesh on the toothing of the screw thread, leaving the axial movement of the same screw free; a toothed pulley is also set on the same bush, coupled with a toothed belt (50).

The belt then couples with a pulley (53) mounted on a transmission shaft (52) on which another pulley (54) is keyed which is in turn connected by means of another toothed belt (51) with a ring (47) fixed on the nut screw (46).

The housing (55) in this non-exclusive example, also houses the interposed synchronisation means, such as the transmission shaft, belts and pulleys.

A further embodiment (FIGS. 44 and 45) is obtained by increasing the slope of the thread of the screw (56) and nut screw (57) or roller until it reaches a value so that it generates the motoring over between the threads to prevent blocking of the nut screw (57) or the roller even in the absence of a load. The slope will in any case be less than the value that generates, under load, nut screw (or roller) rotation, the screw rotation being blocked (or vice-versa), producing a relative axial sliding motion between screw and housing, and the slope will also depend on the thread profile and on the friction between the surfaces in contact.

Synchronisation by means of special threading characteristics (toothed or sloped) can also be used in particular forms of screws with satellite rollers or roller ricirculation, between the screw threads and the roller threads and/or between the roller threads and those of the housing. As a non-exclusive example, the satellite rollers (59 in FIGS. 46 and 47) mounted in the cage (60), synchronised with the screw (58) also rotate inside the housing (61) whose internal wall has no threading or grooves, but at the most, only a toothing able to couple with that of the thread of the rollers (59). The edges in relief of the same internal wall of the housing support the load transmitted by the rollers.

With the same threading step, the thread slope varies with the nominal diameter and the threading direction; consequently, the threads of two elements having different diameters also have a different slope (FIG. 49). Also with a different slope at the tangential point are threads with the same diameter and threading direction in the case of a screw and coupled with a roller. Therefore it can be noted that:

Necessarily, the thread cannot have a rectangular profile, otherwise there is no coupling between the screw and nut screw or between the screw and the roller;

In the thread having a triangular or trapezoidal profile, there is coupling, but if a slight amount of clearance is not allowed for, there are two contact points (P1 and P2 in FIG. 48), one on one flank and one on the opposite flank of the thread, not aligned on a same straight line parallel to the screw axis (except in the case of screw and roller with identical nominal diameter and threading direction);

The relative rotation axis (C in FIG. 48) between the screw and nut screw (or roller) is positioned on the plane passing through the screw axis and the nut screw (or roller) axis, and therefore in an intermediate zone between the contact points of the threads, exactly in the tangential point of the pitch diameters Dpv and Dpm of relative rotation between the screw and nut screw (or roller).

Given these conditions, in the absence of external loads, there are arms (B in FIG. 48), of the friction forces in relation to the centre of relative rotation (C in FIG. 48), which reduce the efficiency.

Therefore it is essential that slight clearance be left so that each turn of the nut screw thread has only one single contact point (P1 or P2 in FIG. 48) with the screw thread.

Moreover, the efficiency improves by minimizing arm B of the friction forces: this is mainly obtained by increasing the difference in slope between the screw nut screw (or roller) threads. In particular, when the screw and nut screw threads have the same direction, the efficiency increases with the increase in the ratio between the diameter of the nut screw and that of the screw.

The minimum pre-load influence is obtained with screw and roller of the same diameter, same profile, step, number of starts, and threading direction (FIGS. 22 and 23), the best condition in order to obtain maximum efficiency even when clearance is absent.

Since the load is not sent to be bourn by the thread crests (zone that is also notched by the toothing) causing maximum tension in the material, and to prevent chipping the crests themselves, which leads to tiny granules that can damage the whole mechanism, both the female threading (F in FIGS. 52 and 53) as well as the male threading (M in FIGS. 52 and 53) will have crests with round edges RC (FIGS. 52 and 53).

To reduce the tension in the bottom zone of the thread, the maximum connecting radius RFM (FIG. 53) is realised between the two threads.

A further requisite for the threading is the necessity for a cylindrical surface (SC in FIGS. 52 and 53) on the crest of the screw thread (M) (like on the trapezoidal threads) to obtain good support on the screw guide bearings (7).

To obtain an approximately circular load distribution zone among the threads, with maximum tension in the centre, positioned in proximity of the pitch circumferences of the rotation between threads, the ideal profile of the tooth is that which generates a sphere-sphere type contact. Practically speaking, this involves making the screw and roller thread, point by point, as close as possible to a convex spherical surface (SM in FIGS. 2 and 53) while the nut screw thread must necessarily be of the concave-sphere type (SF in FIGS. 52 and 53). The construction profile could become slightly different from the theoretical profile, both for easier construction reasons, as well as for the fact that the circular contact area must be obtained mainly under load, that is, with deformed threads. So the real profile of the thread section in the contact zone (thread flanks) must be such that it generates, once loaded, an approximately circular contact zone.

Another threading requisite is that is must be deep enough to permit toothing on the crest or in the groove of the screw thread (or of the nut screw or of the roller), without however reducing the contact area of the threads.

Since the contact between the screw and nut screw occurs in an extremely limited zone (almost punctiform) the surface of the screw and nut screw (or roller) will be subject to wear. Therefore, to guarantee sufficiently long working life, advantageously the screw and the nut screw will be hardened on the surface by means of at least one of the surface hardening treatments such as ammonia hardening, case-hardening, quench-hardening, etc.

The presence of the synchroniser therefore permits the ratio precision and constancy between travel velocity and command velocity, guaranteeing accurate positioning of the screw in relation to the body. Moreover it permits simultaneous control over the nut screw (or roller) as well as over the screw, and no longer simple motoring over of one of the two elements through friction. The problem of motion irregularity is eliminated, together with whiplash, and the mechanism can be used for precision motion. Once one of the two coupled threaded elements is blocked, the rotation and the relative sliding action of the other element are also blocked. The optimised threading, together with the absence of internal preloads, and the surface hardening that reduces wear as well as friction, all provide maximum mechanism efficiency.

The invention claimed is:

1. A rolling screw comprising:
a housing;
a first threaded male member comprising a screw with a thread having one or more starts;
a second threaded female member having a thread suitable for continuous coupling with said first threaded male member;
first means for allowing the second threaded female member to rotate freely in relation to the housing and preventing axial and radial movements of the second threaded female member;
second means for maintaining the axis position of said first threaded male member fixed and constant with respect to the housing and to maintain the axis of said first threaded male member parallel to and spaced from the rotation axis of said second threaded female member, and allowing axial sliding and rotation of said first threaded male member with respect to the housing; and coupling said first threaded male member and the second threaded female member;
third means for proving synchronization of the relative rotation between said first threaded male member and the second threaded female member;
the threading of one of the two threaded members permitting transmission of the rotation from one of the threaded members to the other of the threaded members without relative tangential sliding,
wherein said second threaded female member is a nut screw,
said nut screw having internal threading with a nominal diameter greater than the threading of said first threaded male member, and
one or more ring gears coaxial with the nut screw and configured to couple with the thread of said first threaded male member.

2. The rolling screw according to claim 1, wherein at least one of the threads of the first threaded male member has toothing on a crest, in a groove or on a flank of the thread.

3. The rolling screw according to claim 1, wherein the first means comprise one or more bearings mounted around the nut screw, that permit the nut screw to rotate freely around an axis of the nut screw, but prevent axial or radial movement in relation to the housing, an internal ring of said bearings composed of the nut screw or the nut screw is keyed in the internal ring of said bearings, an external ring of said bearings being the housing or being in contact with said housing.

4. The rolling screw according to claim 1, wherein said second means comprise a pair of rolling or sliding bearings, located in proximity to a base of the nut screw, an external ring fixed to said housing and said first threaded male member inserted into the internal ring, permitting axial movement and rotation, but preventing radial movements of the screw, an internal ring of said that guides said first threaded male member, a bush being keyed to match the size of an internal diameter of the internal ring of the bearing to a size of an external diameter of said first threaded male member.

5. The rolling screw according to claim 1, wherein said second means allow the presence of clearance between the threadings of said first threaded male member and said second threaded female member.

6. The rolling screw according to claim 1, wherein the crest of the thread of said first threaded male member presents a cylindrical surface having a diameter equal to the external diameter of the threading, to guarantee a support surface for said first threaded male member on said second means.

7. The rolling screw according to claim 1, wherein said first threaded male member and said second threaded female member have a threading profile according to which each area of contact between the thread of said first threaded male member and the thread of said second threaded female member is substantially a circle.

8. The rolling screw according to claim 1, wherein said first threaded male member has undergone surface hardening treatment in order reduce wear and friction.

9. The rolling screw according to claim 8, wherein the surface hardening treatment comprises ammonia hardening, case-hardening or quench hardening.

10. The rolling screw according to claim 1, wherein said second threaded female member has undergone surface hardening treatment in order reduce wear and friction.

11. The rolling screw according to claim 10, wherein the surface hardening treatment comprises ammonia hardening, case-hardening or quench hardening.

12. The rolling screw according to claim 1, wherein the surfaces on which the axial slide action of said first threaded male member occur, are hardened by means of a surface hardening treatment in order reduce wear and friction.

13. The rolling screw according to claim 12, wherein the surface hardening treatment comprises ammonia hardening, case-hardening or quench hardening.

14. The rolling screw according to claim 1, wherein the gear ratio in the relative rotation without sliding action between said first threaded male member and said second threaded female member is equal to the ratio between a rolling pitch diameter of the thread of said first threaded male member and a rolling pitch diameter of the thread of said second threaded female member, in such a manner so that it maintains the ratio between linear travel and a command rotation constant and independent of loads and velocity.

15. The rolling screw according to claim 1, wherein said first threaded male member presents toothed thread crests.

* * * * *